UNITED STATES PATENT OFFICE.

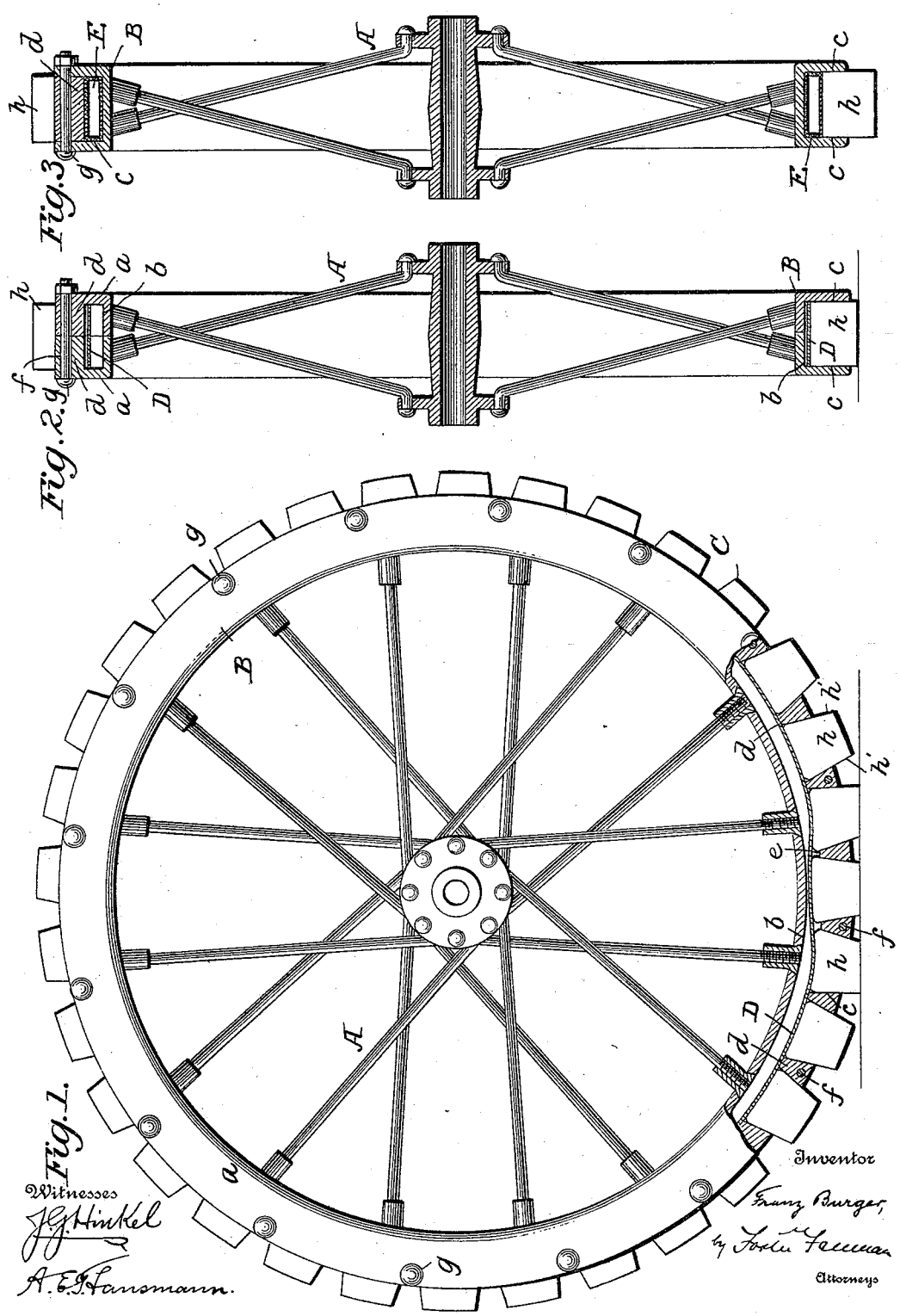

FRANZ BURGER, OF FORT WAYNE, INDIANA, ASSIGNOR OF THREE-FOURTHS TO HENRY M. WILLIAMS, OF SAME PLACE.

ELASTIC TIRE AND RIM.

SPECIFICATION forming part of Letters Patent No. 607,824, dated July 26, 1898.

Application filed August 7, 1897. Serial No. 647,437. (No model.)

*To all whom it may concern:*

Be it known that I, FRANZ BURGER, a citizen of the United States, residing at Fort Wayne, in the county of Allen and State of Indiana, have invented certain new and useful Improvements in Elastic Tires and Rims Therefor, of which the following is a specification.

This invention relates to certain new and useful improvements in elastic or cushion tires for wheels and in the rims therefor, and is designed more especially for use on the wheels of heavy vehicles and traction-engines, although the invention may also be employed to advantage on the wheels of lighter vehicles of various kinds.

The objects of the invention are to generally improve and simplify the construction of tires of this kind, to render them more easy of application to and removal from the wheel rim, to facilitate their repair when injured or worn, to prevent slipping on wet or soft roads, and at the same time to provide a tire which, while possessing the cushioning qualities of the pneumatic tire, will not be liable to serious injury by contact with sharp objects.

To these ends the invention consists in the construction and arrangement of parts, substantially as hereinafter fully set forth, and illustrated in the accompanying drawings, in which—

Figure 1 is a side elevation, partly in section, of a wheel provided with my improvements. Fig. 2 is a central cross-section thereof, and Fig. 3 is a similar view showing a modification.

Referring to the drawings, A designates a wheel, and B the rim, which is preferably made of metal and to which the spokes may be secured in any suitable way. In the preferred embodiment of the invention shown in Figs. 1 and 2 the rim is composed of two similar rings or sections $a\,a$, each of an approximate L shape in cross-section, so that when properly secured together side by side the rings or sections form a trough-like rim with a substantially flat bottom $b$ and parallel sides $c\,c$.

The sides of the sections $a\,a$ are each provided at regular and uniform distances apart with inwardly-projecting portions or studs $d$, so disposed that when the sections are in their proper relation the opposing studs are in line with each other, and thus extend from side to side of the rim. These studs are wedge-shaped in transverse section, as clearly seen at the bottom of Fig. 1, and are arranged with the narrow edge $e$ toward the bottom of the rim, although said edge is more or less distant therefrom. At suitable points openings $f$ extend through the sections $a$ and studs $d$ to permit the passage of bolts $g$, by which the sections are detachably secured together.

The tire C is formed of a series of separate cushions or blocks $h$, of some suitable yielding or compressible material, as vulcanized rubber, fitted snugly into the spaces or pockets formed by the sides of the rim and the transverse portions or studs $d$, the outer ends of the blocks projecting beyond the periphery of the rim to any desired extent and forming the tread portion of the tire. The sides $h'$ of these blocks are inclined, as shown, to conform to and be engaged by the adjacent inclined sides of the studs $d$, so that the blocks are thereby securely held in place and all danger of their accidental displacement avoided.

The blocks $h$ rest upon a yielding support interposed between their inner ends and the bottom of the rim, thereby giving additional elasticity to the tire. This yielding support may be variously made; but, as shown in Figs. 1 and 2, it consists of a stout flat spring-metal band or hoop D, located in the channel of the rim above its bottom and immediately below the transverse portions or studs $d$ and filling the space between the sides of the rim. This hoop is preferably of such a diameter as to normally engage the inner edges $e$ of the studs $d$ throughout its entire circumference and tends at all times to maintain the blocks $h$ in their projected position and in engagement with the overhanging sides of said studs; but as the blocks are compressed by contact with the ground the spring yields more or less, according to circumstances, and thus in effect increases the cushioning action of the blocks.

In the modification shown in Fig. 3 the rim consists of a single piece of metal, and the transverse wedge-shaped studs or pieces $d$ are independent thereof and are adapted to be detachably secured in place between the sides $c\ c$ by the bolts $g$. In this instance also the yielding support for the blocks $h$ of the tire is shown as consisting of an air-cushion E, which when fully inflated completely fills the channel of the rim below the pieces $d$ and effectually maintains said blocks in proper relative position.

It will be apparent that if any of the blocks $h$ of the tire should become worn or injured they may be readily removed and replaced by new ones. Thus in the construction illustrated in Figs. 1 and 2 by withdrawing the bolts $g$ the sections of the rim may be easily separated and any one or more of the blocks detached from between the studs $d$, when other blocks may be substituted and the sections again secured together. In the form illustrated in Fig. 3 the blocks may be detached by simply removing the intermediate wedge-shaped pieces $d$ and be again as easily replaced, as will be understood.

It will further be seen that as the blocks $h$ completely fill the spaces or pockets occupied by them and when in contact with the ground are compressed and thereby spread laterally into closer engagement with the walls of said spaces there is little or no danger of water or dirt working in behind the blocks.

The improved tire possesses superior cushioning qualities and effectually absorbs the shocks or concussions due to the passage of the vehicle over rough roads, thereby rendering its movement smooth and easy.

Without limiting myself to the precise construction shown and described, I claim—

1. The combination with the trough-like rim, of a tire located therein and composed of a series of compressible blocks having inclined sides, wedge-shaped studs or crosspieces for securing the blocks in place, and a spring-metal hoop interposed between the blocks and the bottom of the rim, substantially as described.

2. The combination with the trough-like rim composed of sections each having inwardly-projecting wedge-shaped studs, of a tire consisting of compressible blocks having inclined sides and located between said studs, a yielding support below the studs for said blocks, and means for securing said sections together, substantially as described.

3. The combination with the trough-like rim composed of sections each having inwardly-projecting wedge-shaped studs, of a tire consisting of compressible blocks with inclined sides located between said studs, a flat spring-metal hoop normally engaging the inner edges of said studs and forming a support for said blocks, and bolts passing through said sections and studs, substantially as described.

In testimony whereof I have signed my name to this specification in the presence of two subscribing witnesses.

FRANZ BURGER.

Witnesses:
GEO. K. TORRENCE,
GEO. D. CRANE.